(12) United States Patent
Poehlmann

(10) Patent No.: US 9,854,748 B2
(45) Date of Patent: Jan. 2, 2018

(54) HANDHELD PRUNING TOOL

(71) Applicant: Paul Mechanical Design Group, Inc., Heriot Bay (CA)

(72) Inventor: Paul W. Poehlmann, Heriot Bay (CA)

( * ) Notice: Subject to any disclaimer, the term of this patent is extended or adjusted under 35 U.S.C. 154(b) by 0 days.

(21) Appl. No.: 14/557,264

(22) Filed: Dec. 1, 2014

(65) Prior Publication Data
US 2016/0150737 A1     Jun. 2, 2016

(51) Int. Cl.
*A01G 3/02*     (2006.01)
*A01G 3/08*     (2006.01)

(52) U.S. Cl.
CPC ............... *A01G 3/02* (2013.01); *A01G 3/083* (2013.01)

(58) Field of Classification Search
CPC .......... A01G 3/02; A01G 3/083; A01G 3/021; A01G 3/025; A01G 3/0475; A01G 3/065; B26B 13/00; B26B 13/28; B25B 7/06
See application file for complete search history.

(56) References Cited

U.S. PATENT DOCUMENTS

| | | | | |
|---|---|---|---|---|
| 4,238,862 | A * | 12/1980 | Leatherman | B25B 7/22 7/128 |
| 5,265,969 | A * | 11/1993 | Chuang | A45B 17/00 16/329 |
| 2005/0193498 | A1* | 9/2005 | Klecker | A01G 3/02 7/158 |
| 2010/0192382 | A1* | 8/2010 | Burch | B23D 51/01 30/161 |

* cited by examiner

*Primary Examiner* — Liang Dong
(74) *Attorney, Agent, or Firm* — R. Tracy Crump

(57) ABSTRACT

The pruning tool incorporates the functions of a pruning shear and a pruning saw into a single handheld tool. The pruning tool includes a conventional pruning shear and a folding saw blade that pivotally deploys from a stowed position within the handle to an extended operational position.

7 Claims, 14 Drawing Sheets

HANDHELD PRUNING TOOL

This invention relates to handheld tools for pruning trees, shrubs and other plants, and in particular a hand tool that integrates a folding saw into a pruning shear.

BACKGROUND AND SUMMARY OF THE INVENTION

Pruning shears and pruning saws are handheld tools commonly used in the pruning of plants and trees. Pruning shears, also called hand pruners or secateurs, are specialized scissors used for cutting small limbs and branches. Pruning saws are specialized saws designed for cutting branches that are too dense for pruning shears.

Typically pruning shears can be used to cut plant limbs up to two centimeters without damaging the plants, but pruning saws should be used to cut limbs greater than two centimeters thick to prevent plant damage. Attempting to cut limbs and branches of too large a diameter with pruning shears tends to result in crushing injury to the plant tissue around the cut. Tissue damaged caused by this crushing of pruning shears slows the rate at which cuts can callous and heal, and can introduce and encourage plant pathogens. In addition, a poorly-made cut may eventual result in branch dieback. Each cut must be clean, and must be made in such a way as to do as little unnecessary damage to the plant as possible. Seldom, can pruning tasks be appropriately accomplished using just a pruning shear.

The current practice for the pruning of most woody plants by hand demands the use of both a pruning shear and a small pruning saw. Consequently, users are constantly switching between a pruning shear and a pruning saw. Since a typical pruning session may involve thousands of cuts, often made by a user positioned atop a ladder, transferring between a pruning shear and a pruning saw consumes a significant amount of time and requires the user to carry, stow and manipulate both hand tools.

The pruning tool of this invention incorporates the functions of a pruning shear and a pruning saw into a single handheld tool. The pruning tool of this invention allows the user to quickly transition from clipping limbs using the tool as a pruning shear to cutting limbs using the tool as a pruning saw. The pruning tool takes the form of a conventional pruning shear that incorporates a folding saw blade into one of the handles of the shear. The saw blade is pivotally deploys from a stowed position within the handle to an extended operational position. In certain embodiments, the saw blade is deployed from the forward end of the handle and in other embodiments, the saw blade deploys from the aft end of the handle.

The pruning tool of this invention reduce the time and effort required to prune a particular plant, tree or shrub. The user can quickly, easily and safely transition between pruning functions. Consequently, the pruning tool eases the stress and physical effort in the pruning process. In addition, combining the functions of a pruning shear and pruning saw into a single hand tool encourages the users to properly utilize the tool for a clean cut, as opposed to, attempting to cut a branch that is too large in diameter to shear through resulting in damage and die back.

The above described features and advantages, as well as others, will become more readily apparent to those of ordinary skill in the art by reference to the following detailed description and accompanying drawings.

BRIEF DESCRIPTION OF THE DRAWINGS

The present invention may take form in various system and method components and arrangement of system and method components. The drawings are only for purposes of illustrating exemplary embodiments and are not to be construed as limiting the invention. The drawings illustrate the present invention, in which.

DESCRIPTION OF THE PREFERRED EMBODIMENT

Figure 1:
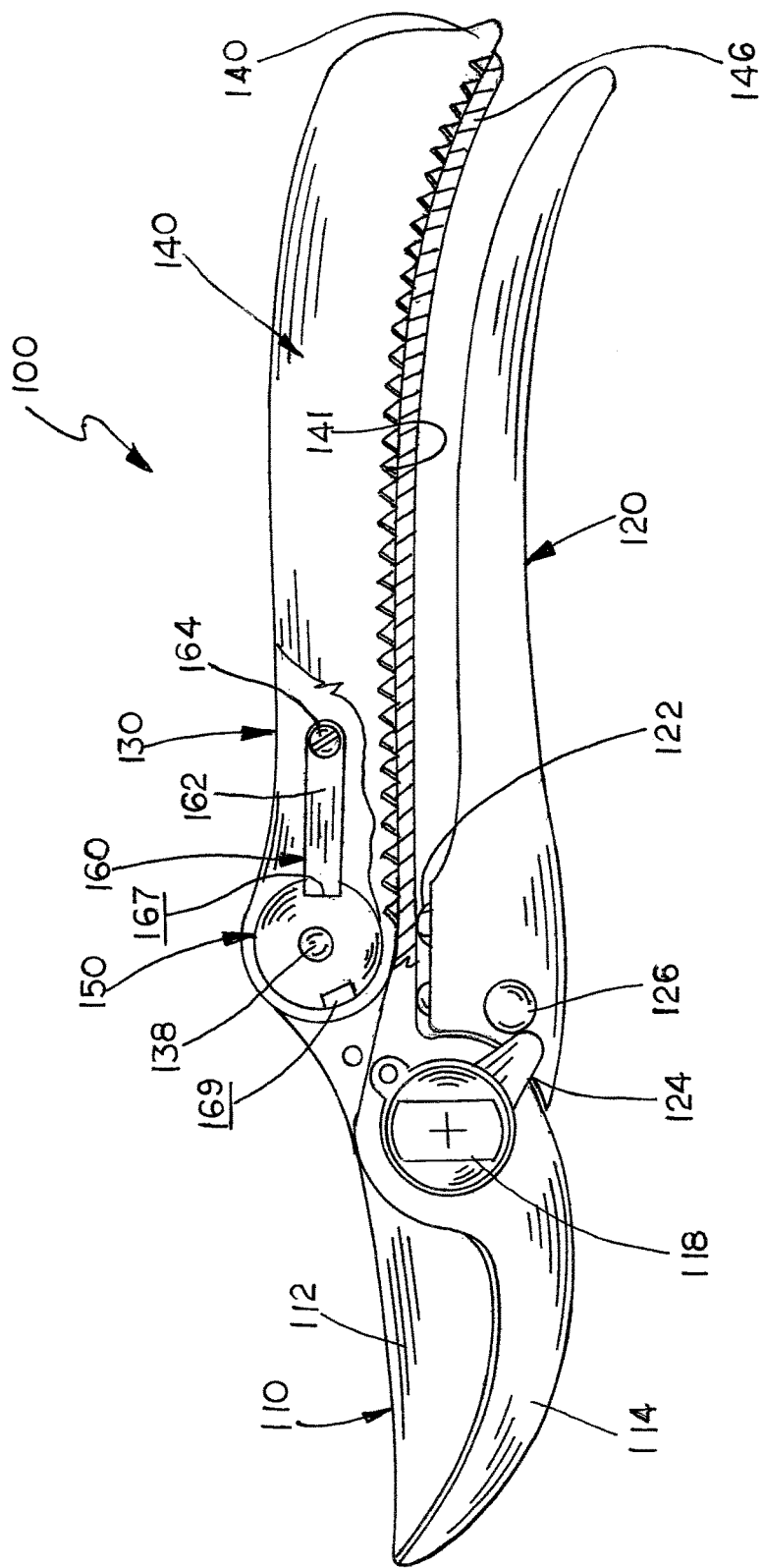
FIG. 1 is a left side view with portions cutaway of an embodiment of the pruning tool of this invention shown with the saw blade retracted.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical, structural and mechanical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Referring now to the drawings, the pruning tools of this invention incorporates the functions of a pruning shear and a pruning saw into a single handheld tool. The pruning tool of this invention allows the user to quickly transition from clipping limbs using the tool as a pruning shear to cutting limbs using the tool as a pruning saw. Each embodiment of the pruning tool takes the form of a conventional pruning shear that incorporates a folding saw blade into one of the shear handles. The saw blade pivotally deploys from a stowed position within one of the shear handles to an extended operational position. Two exemplary embodiments of the pruning tool of this invention are illustrated, one with a forward deploying saw blade (FIGS. 1-11) and one with a rearward deploying saw blade (FIGS. 12-15).

The pruning tools may be adapted in various embodiments as by-pass, anvil or parrot beak style pruners as desired within the teachings of this invention. By-pass shears have two blades that "pass by" each other to make the cut. At least one of the blades will be curved: a convex upper blade with either a concave or straight lower one. Anvil pruners have only one blade that closes onto a flat surface. Parrot-beak pruners consist of a convex blade and a concave passing blades, which trap the stem between them to make the cut. In addition, the pruning tool may employ replaceable cutting and anvil blades in other embodiments. In particular, the cutting blades often have to be removed for sharpening or replacement. Replacement blades may be attached to the handles by rivets or screws to facilitate replacement. Typically, the handles and shear head of the pruning tools are of conventional construction and may be made, cast, formed or otherwise constructed of metal or other suitable materials. Generally, pruning shears are well known in the arts; consequently, the particular details of the shear components and function are not described in detail herein for simplicity and brevity of explanation.

FIGS. 1-11 illustrate a first exemplary embodiment of the pruning tool, which is designated generally as reference numeral 100. As shown, pruning tool 100 includes a shear head 110, a pair of contoured handles 120 and 130, a folding saw blade 140, a saw pivot assembly 150 and a saw blade lock mechanism 160.

Shear head 110 is designed and constructed to function like a conventional pruning shear, which is well known in the arts. As shown, shear head 110 includes a cutting blade 112 and anvil blade 114. Cutting blade 112 is detachably connected to proximal end of a contoured handle 120. Anvil blade 114 is integrally formed, permanently or removably connected to the proximal end of a second contoured handle 130. Cutting blade 112 and anvil blade 114 are connected by a pivot bolt and nut 118, which provide the scissor action of tool 100. Shear head 110 also includes other components, commonly found in pruning shears, such as a volute spring 122 and a handle lock arm 124. The volute spring 122 is disposed within aligned bores in handles 120 and 130 behind the pivot bolt and nut 118. Handle lock arm 124 is operatively mounted to pivot bolt 116 and rotates to abut a stop 126 extending from handle 120 thereby locking the cutting blade 112 and anvil blade 114 in a safe closed position.

Saw blade 140 is a flat curved blade having a single serrated edge 141. The configuration and number of teeth in serrated edge 141 are selected to provide the desired cutting action of the tool. The length of saw blade 140 is selected to seat within a longitudinal slot 131 formed in handle 130. One end of saw blade 140 has a rounded pivot end 142 and a generally tapered distal end 144. The distal end terminates in a blunt tip 146. A square opening 143 is cut, formed or stamped in the pivot end 142 of saw blade 140.

Figure 2:
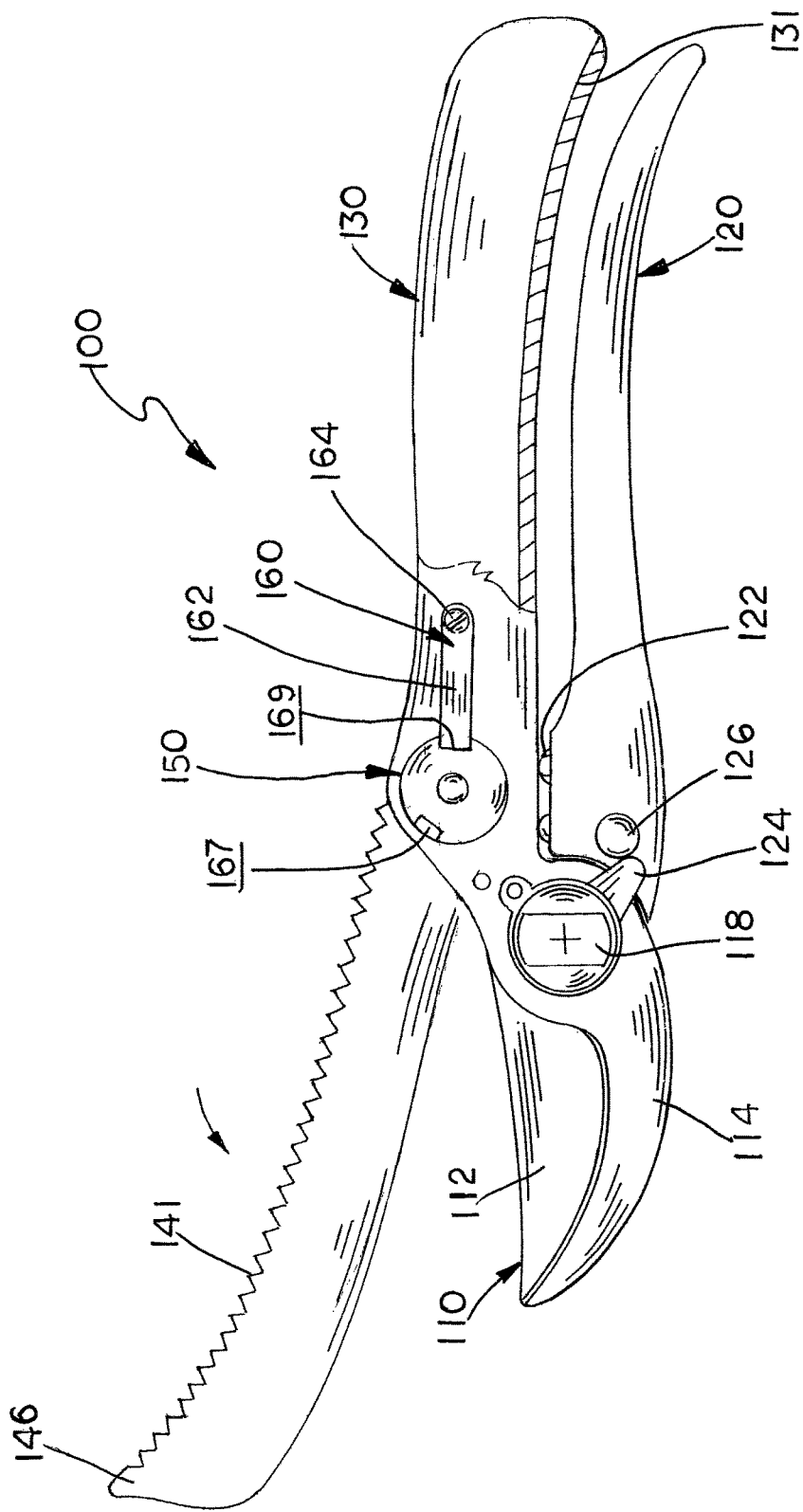
FIG. 2 is a left side view with portions cutaway of an embodiment of the pruning tool of this invention showing the saw blade extended.
Figure 3:
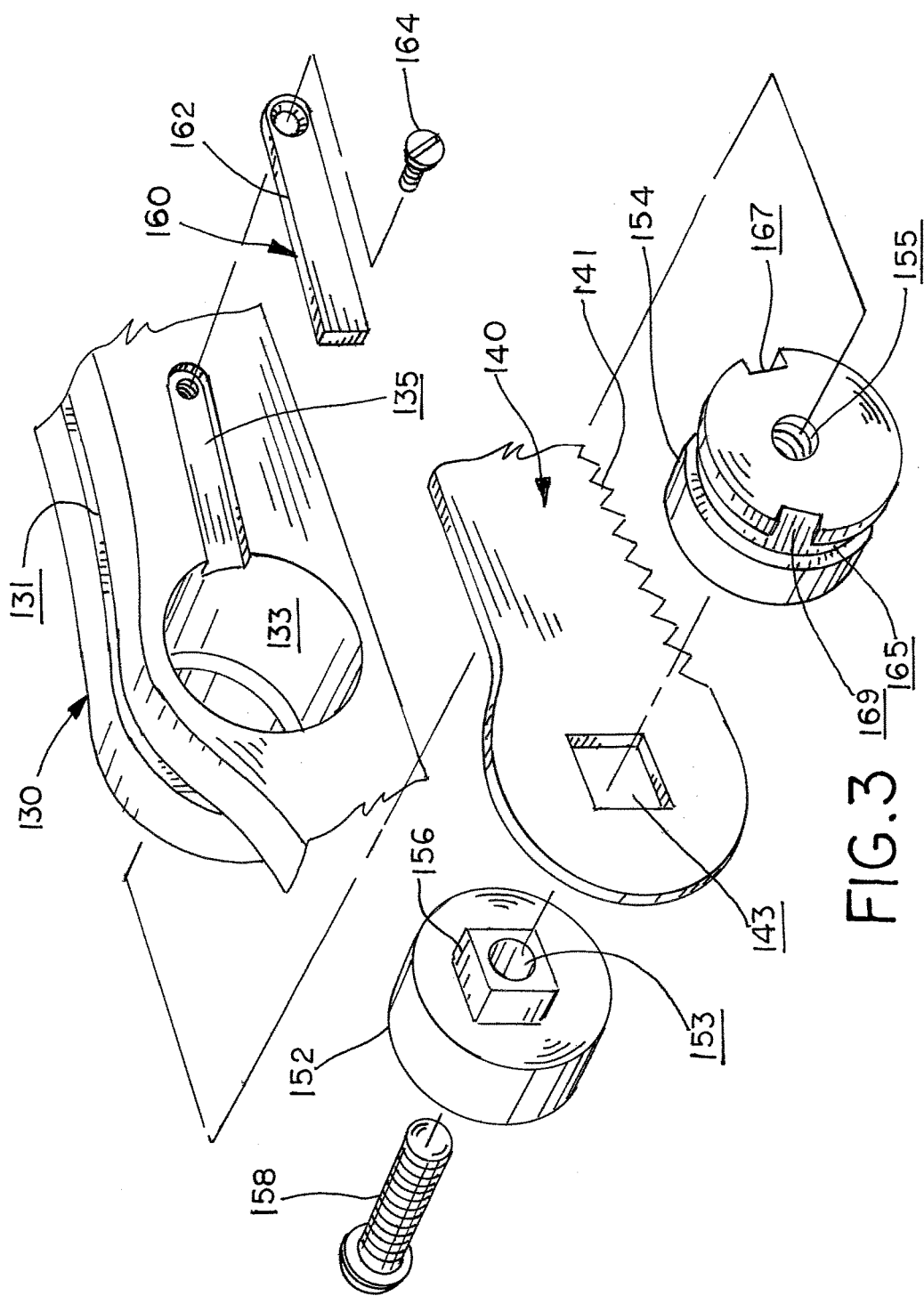
FIG. 3 is a partial exploded left view of the blade pivot and lock mechanism of the pruning tool of FIG. 1.
Figure 4:
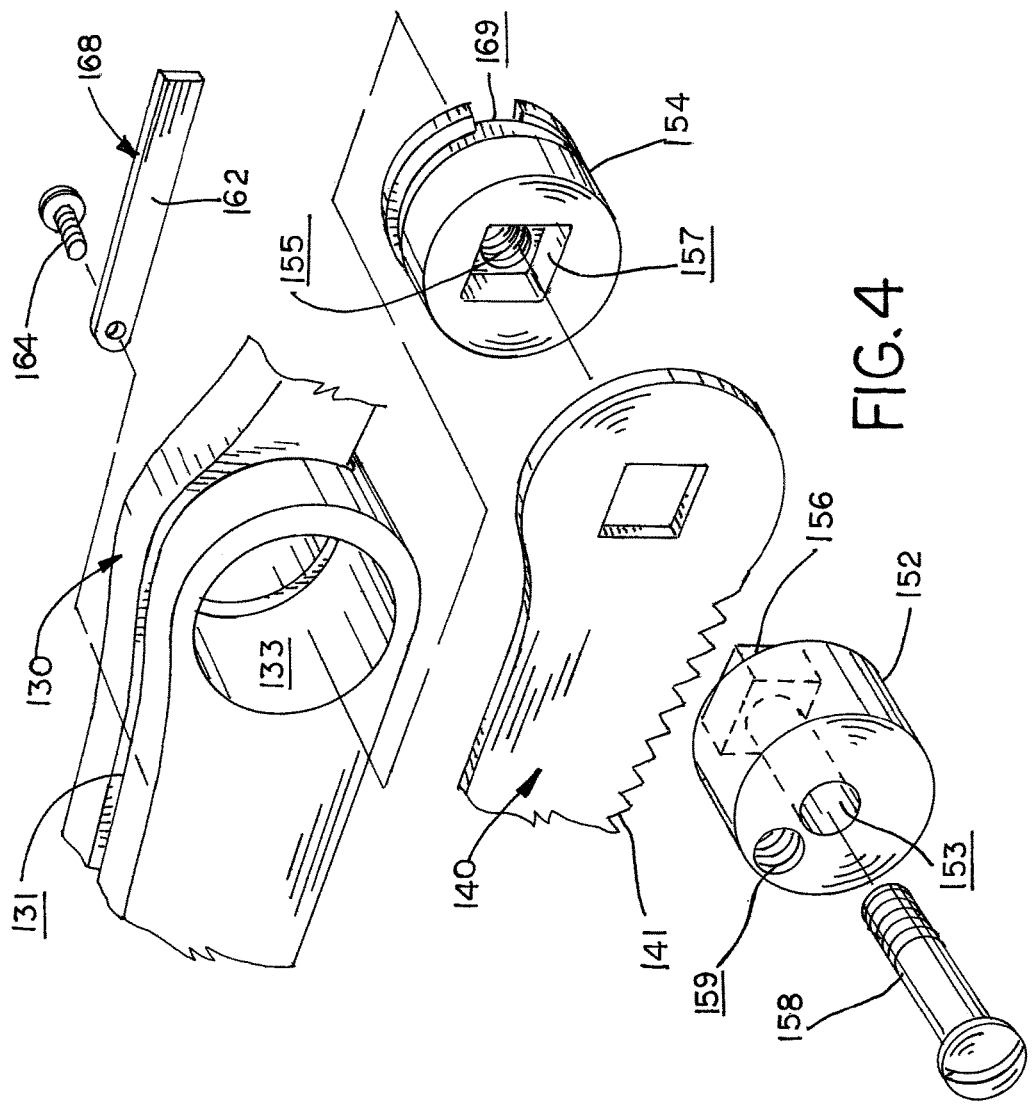
FIG. 4 is a partial exploded right view of the blade pivot and lock mechanism of the pruning tool of FIG. 1.
Figure 5:
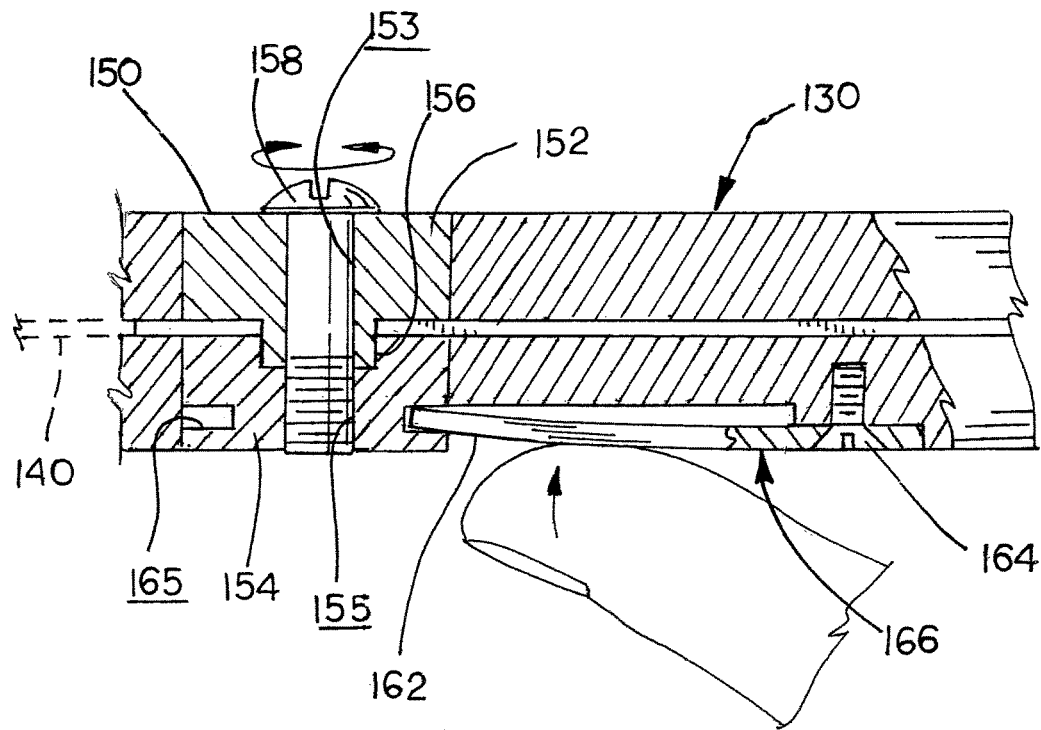
FIG. 5 is a partial top sectional view of the saw blade locking mechanism used in the pruning tool of FIG. 1 shown in an unlocked position.
Figure 6:
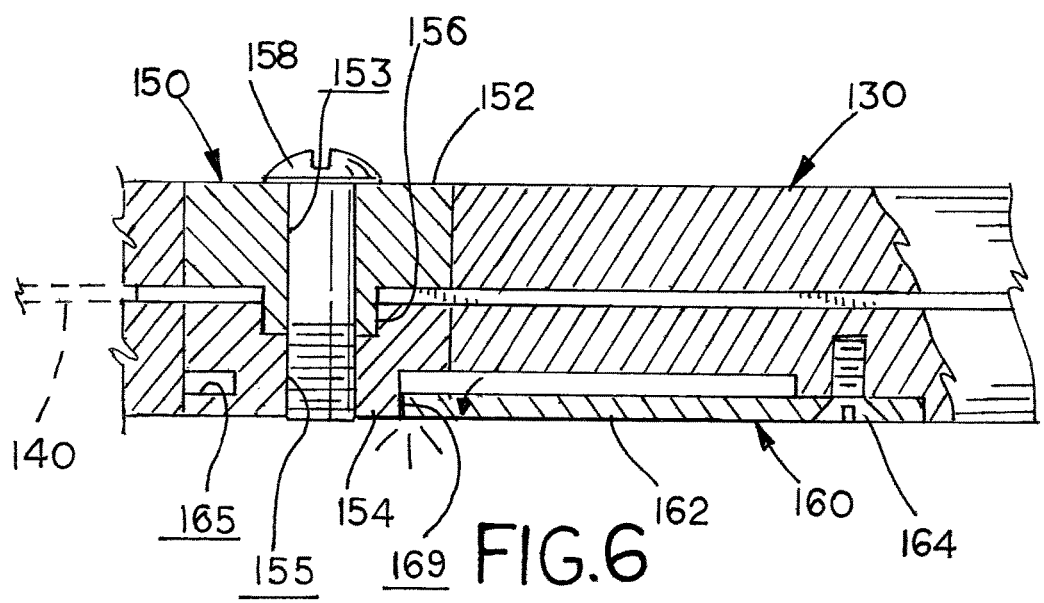
FIG. 6 is a partial top sectional view of the saw blade locking mechanism used in the pruning tool of FIG. 1 shown in an locked position.
Figure 7:
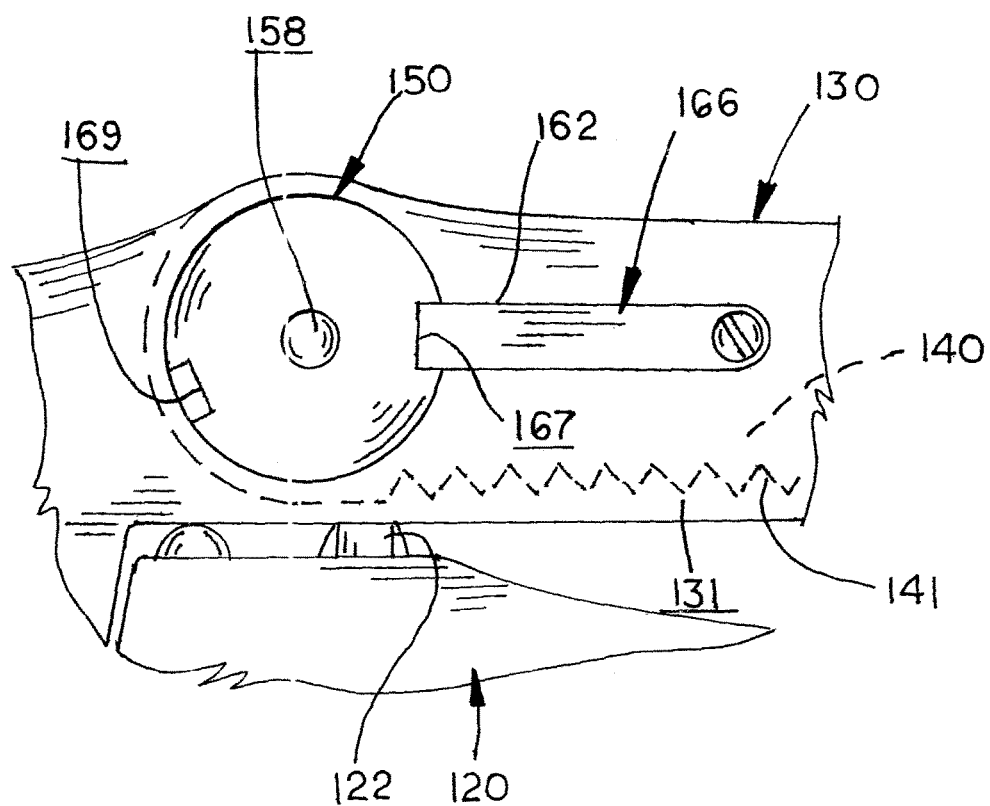
FIG. 7 is a partial left side view of the pruning tool of FIG. 1 showing the saw blade folded in its stowed position within the handle.
Figure 8:
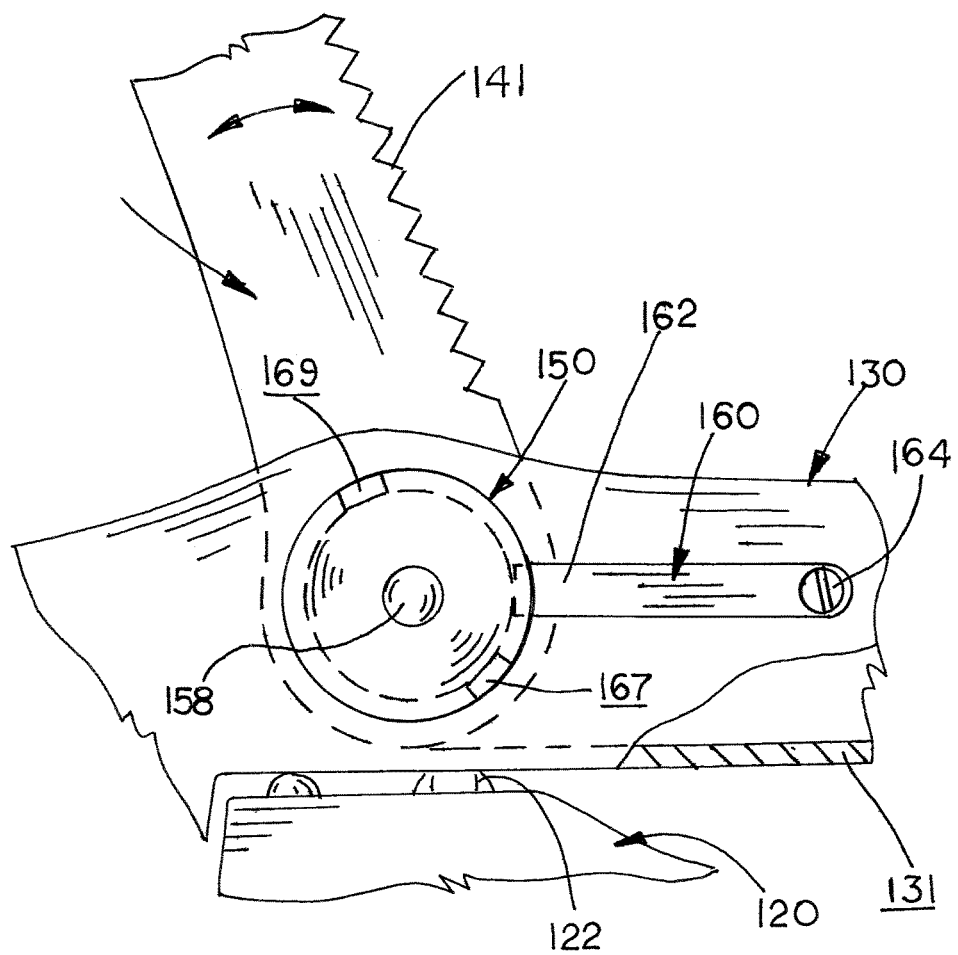
FIG. 8 is a partial left side view of the pruning tool of FIG. 1 showing the saw blade partially deployed.
Figure 9:
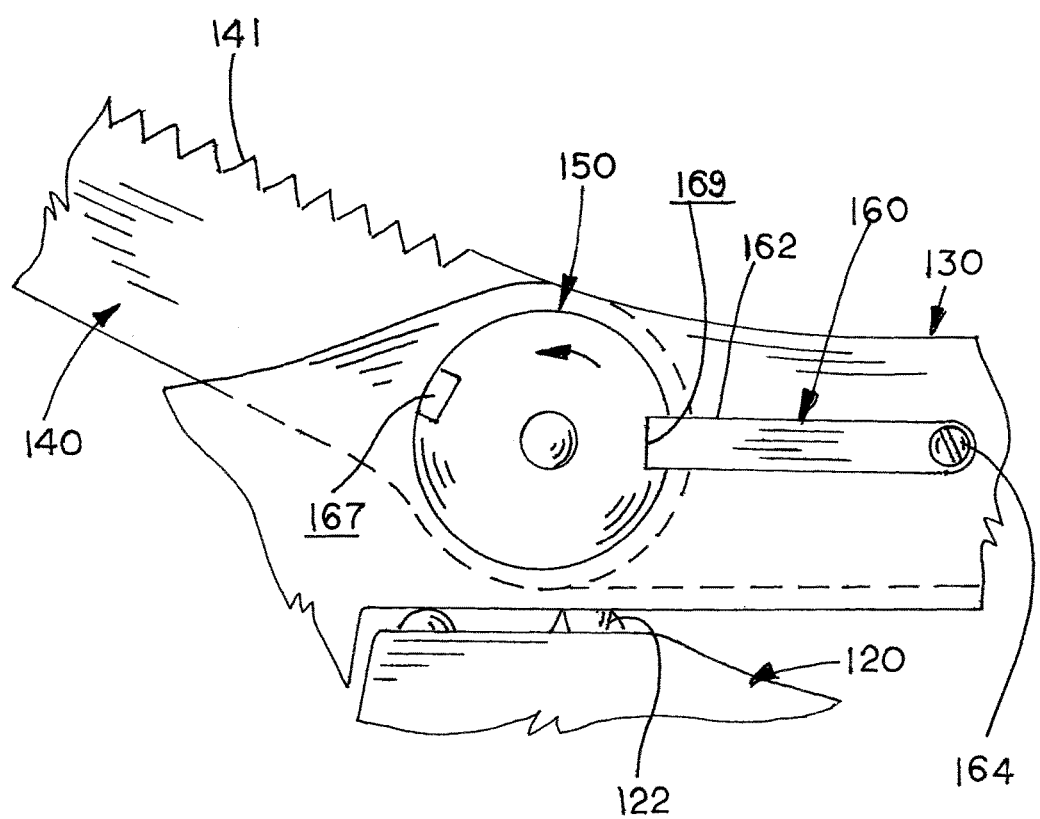
FIG. 9 is a partial left side view of the pruning tool of FIG. 1 showing the saw blade extended in its operating position.

Saw blade 140 is pivotally connected to handle 130 for movement between a stowed position disposed within a longitudinal slot 131 formed in the handle (FIG. 1) and an extended operational position (FIG. 2). Saw blade 140 is pivotally connected to handle 130 by a pivot barrel 150 rotatably disposed within a cylindrical opening 133 formed in the handle. Barrel 150 is a two piece component having two cylindrical halves 152 and 152. Saw blade 140 is sandwiched between barrel halves 152 and 154 secured together by a bolt 158. Bolt 158 extends through a central through bore 153 in barrel half 152 and turns into a threaded bore 155 of barrel half 154. Barrel half 152 has a square head 156 extending from its inner face. Head 156 is dimensioned to seat within square opening 143 of saw blade 140 and a square opening 157 in barrel half 154, thereby operatively mating the blade 140 to barrel 150.

Barrel half 152 also has a threaded 159, which is used for replacing saw blade 140. Bolt 158 can be removed from barrel 150 and partially turned into threaded bore 159 so that the user can grasp bolt 158 and pull barrel half 152 from opening 133 in handle 130. Pulling barrel half 152 from barrel half 154 frees saw blade 140 from head 156 while barrel half 154 remains disposed within handle 130.

Handle 130 also supports a saw blade lock mechanism 160. Saw blade lock mechanism 160 includes a lock bar 162 seated within a slot 135 formed in the left side of handle 130. One end of lock bar 162 is secured to handle 130 by a screw 164. The opposite end of lock bar 162 protrudes into opening 133 and seats in one of two notches 167 and 169 formed in barrel half 154. Barrel half 154 also has an annular groove 165, which allows the protruding end of lock bar 160 to be depressed to allow saw blade 140 to rotate between the stowed and operational positions. As shown in FIGS. 1, 2, 6-9, saw blade 140 is manually moved between the stowed and operational positions. Lock bar 162 is biased to naturally seat into one of the notches 167 and 169 of barrel half 154. In the stowed position, the protruding end of lock bar 162 seats within notch 167 of barrel half 154. In the operational position, the protruding end of lock bar 162 seats within notch 169. Manually depressing the protruding end of lock bar 162 displaces the protruding end from notches 167 and 169 and pushes it into annular groove 165 allowing barrel 150 and saw blade 140 to rotate within opening 133 allowing the saw blade to rotate between the stowed and operational positions.

Figure 10:
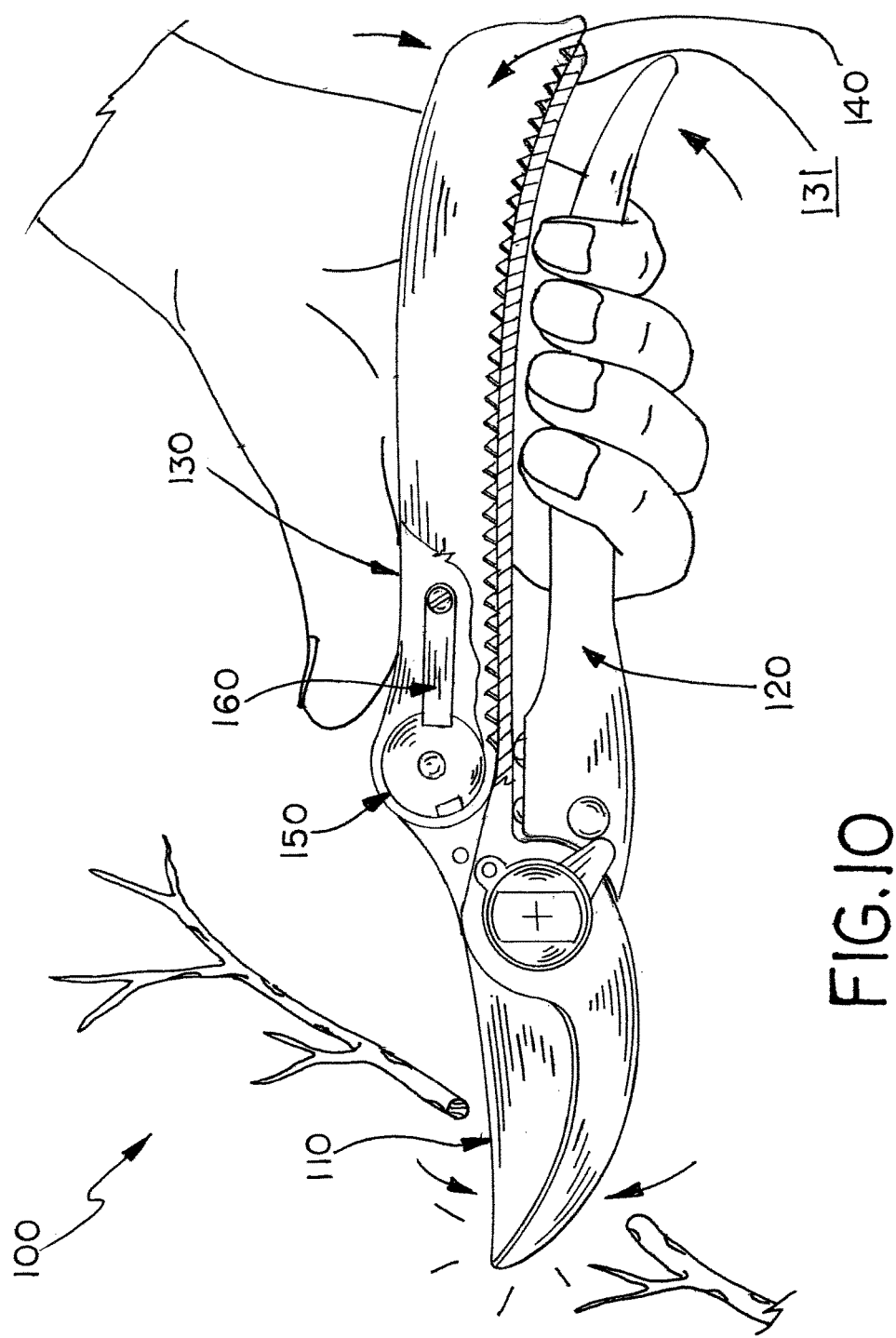
FIG. 10 is a left side view of the pruning tool of FIG. 1 held by a user in the "shear grip"
Figure 11:
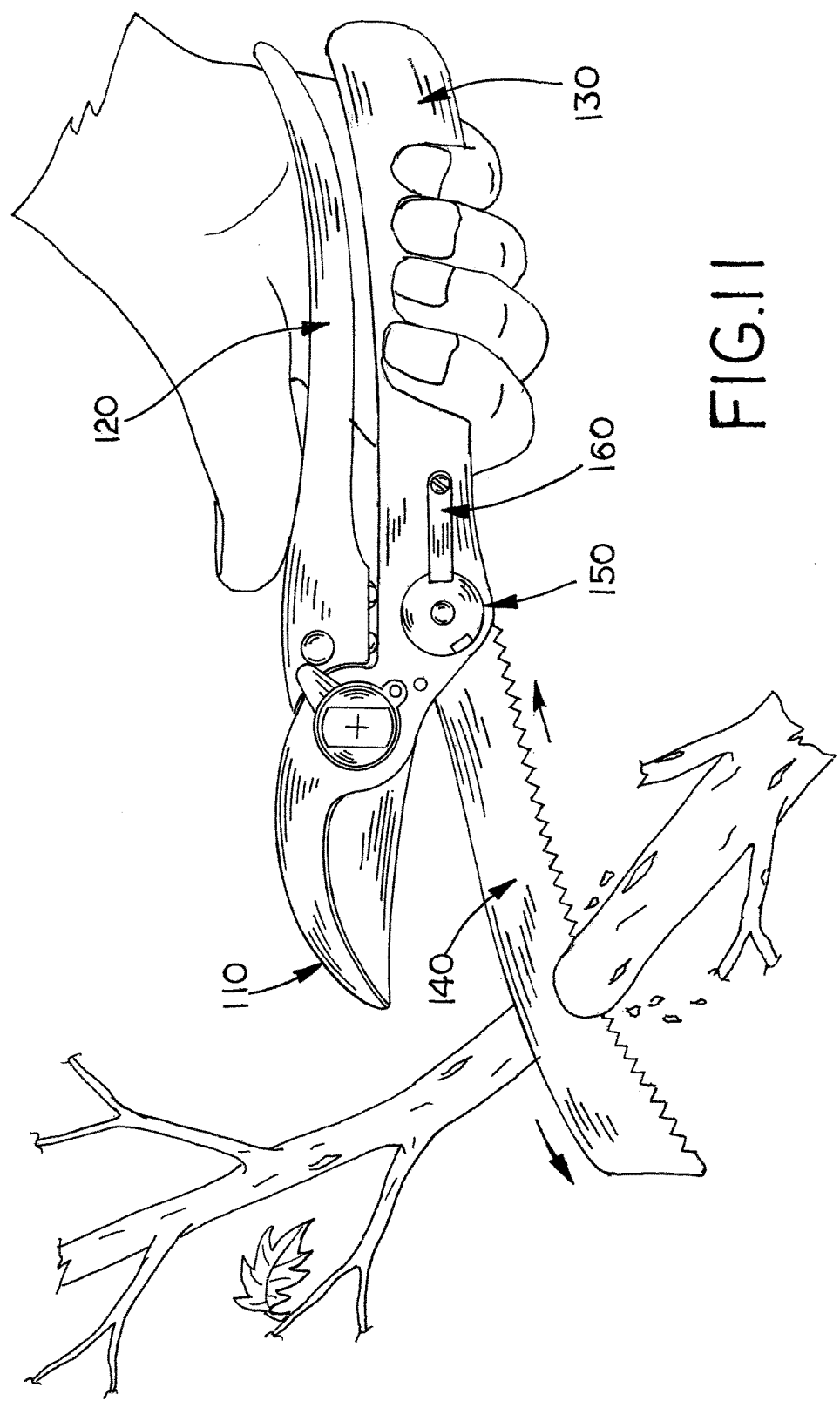
FIG. 11 is a left side view of the pruning tool of FIG. 1 with the saw blade deployed and held by a user in the "saw grip"
Figure 12:
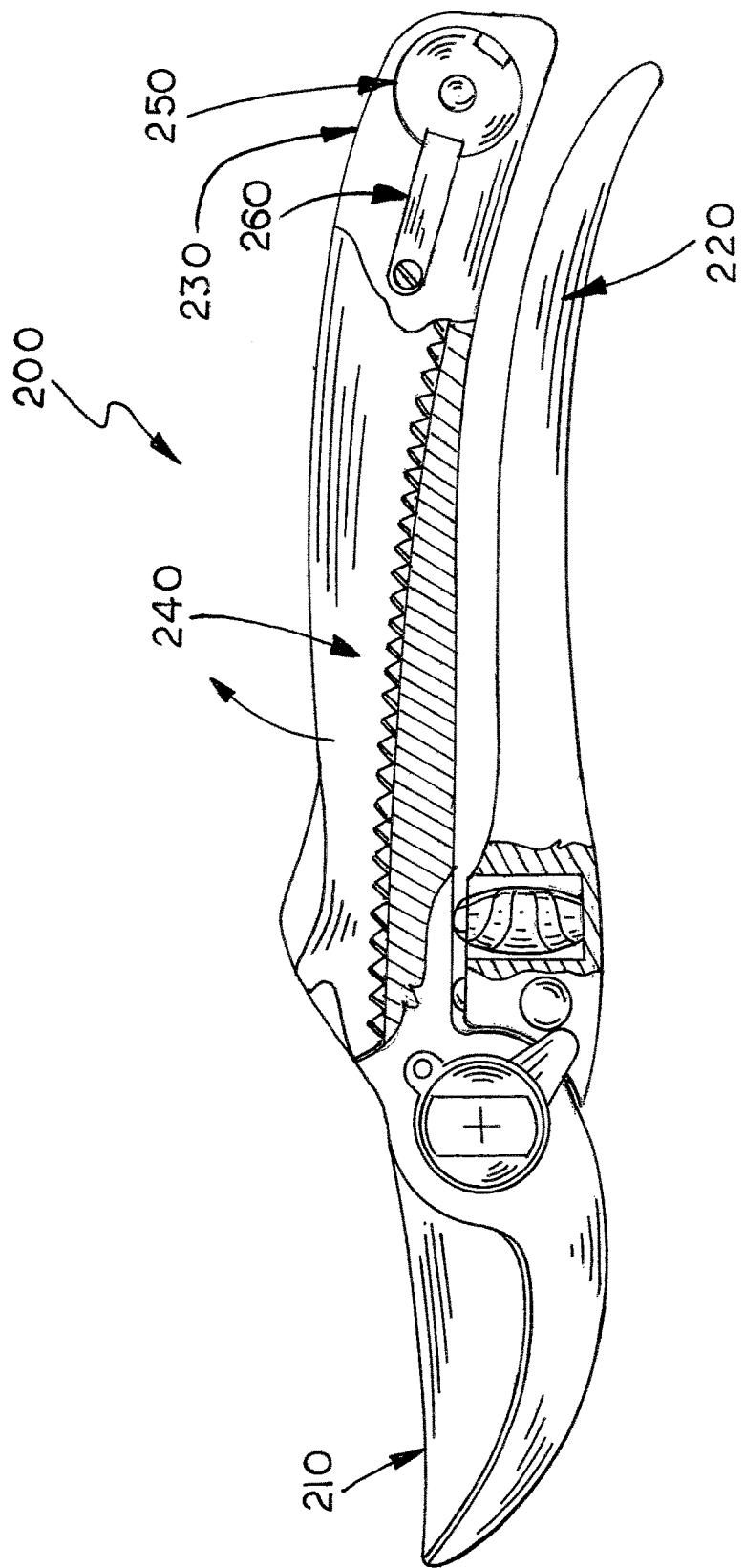
FIG. 12 is a left side view of a second embodiment of the pruning tool of this invention.

FIGS. 10 and 11 illustrated the use of pruning tool 100. In use, pruning tool 100 can be selectively manipulated to function as a conventional pruning shear or pruning saw. A user can transition between using tool 100 as a shear and saw, by simply deploying the saw blade between its stowed and operational positions. Typically, small limbs and branches (less than 2 centimeters in diameter) are pruned using shear head 110. The user assumes a grip on pruning tool 100 where the user's fingers wrap around handle 120 and handle 130 is nested within the user's palm—for reference purposes the "shear grip" (FIG. 10). Using the "shear grip," the user squeezes and release handles 120 and 130 to actuate the movement of cutting blade 112. If a limb is too thick to effectively prune using shear head 110, the user locks handle 120 and 130 using lock arm 124, then depresses lock bar 162 to unlock saw blade 140 and manually rotates the saw blade from its stowed position (FIG. 1) into its extended operation position (FIG. 2). Tip 146 of saw blade 140 allows the user to conveniently pull the blade from the stowed position. In the operational position, lock bar 162 reseats in notch 169 to securely lock saw blade 140 in place. Once saw blade 140 is deployed, the user rotates pruning tool within his hand 180 degrees and assumes a grip where the user's fingers grip handle 130 and handle 120 nests in the user's palm—for reference purposes the "saw grip" (FIG. 11). Using the "saw grip," the user can perform cuts by reciprocating serrated edge 142 across the limb. To transition back to using tool 100 as a shear, the user again depresses lock bar 162 to unlock saw blade 140, manually rotates the saw blade from the extended operation position back to the stowed position within handle 130, and rotates pruning tool 100 to reassume the shear grip on the tool.

Figure 13:
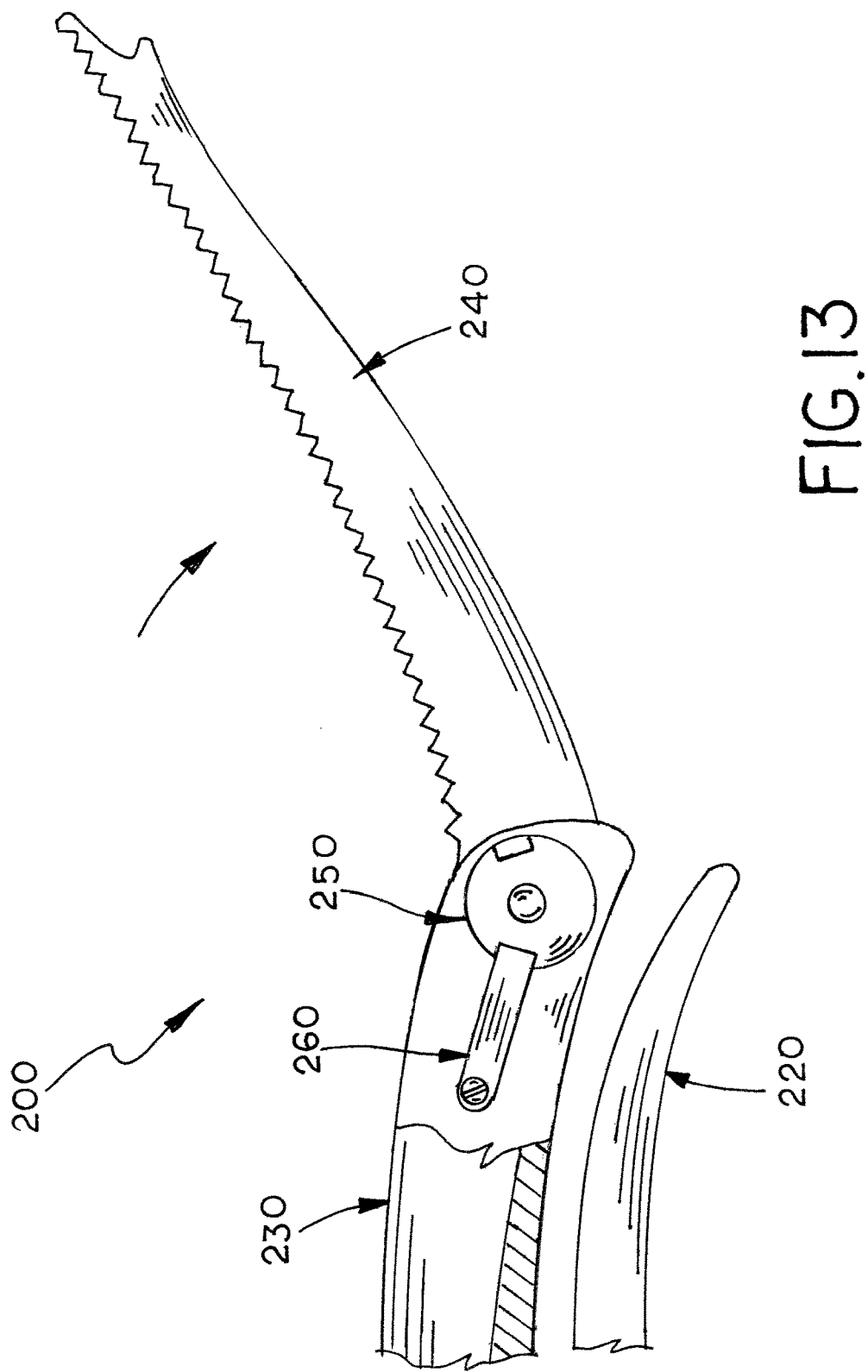
FIG. 13 is a left side view of the pruning tool of FIG. 12 with the saw blade deployed.
Figure 14:
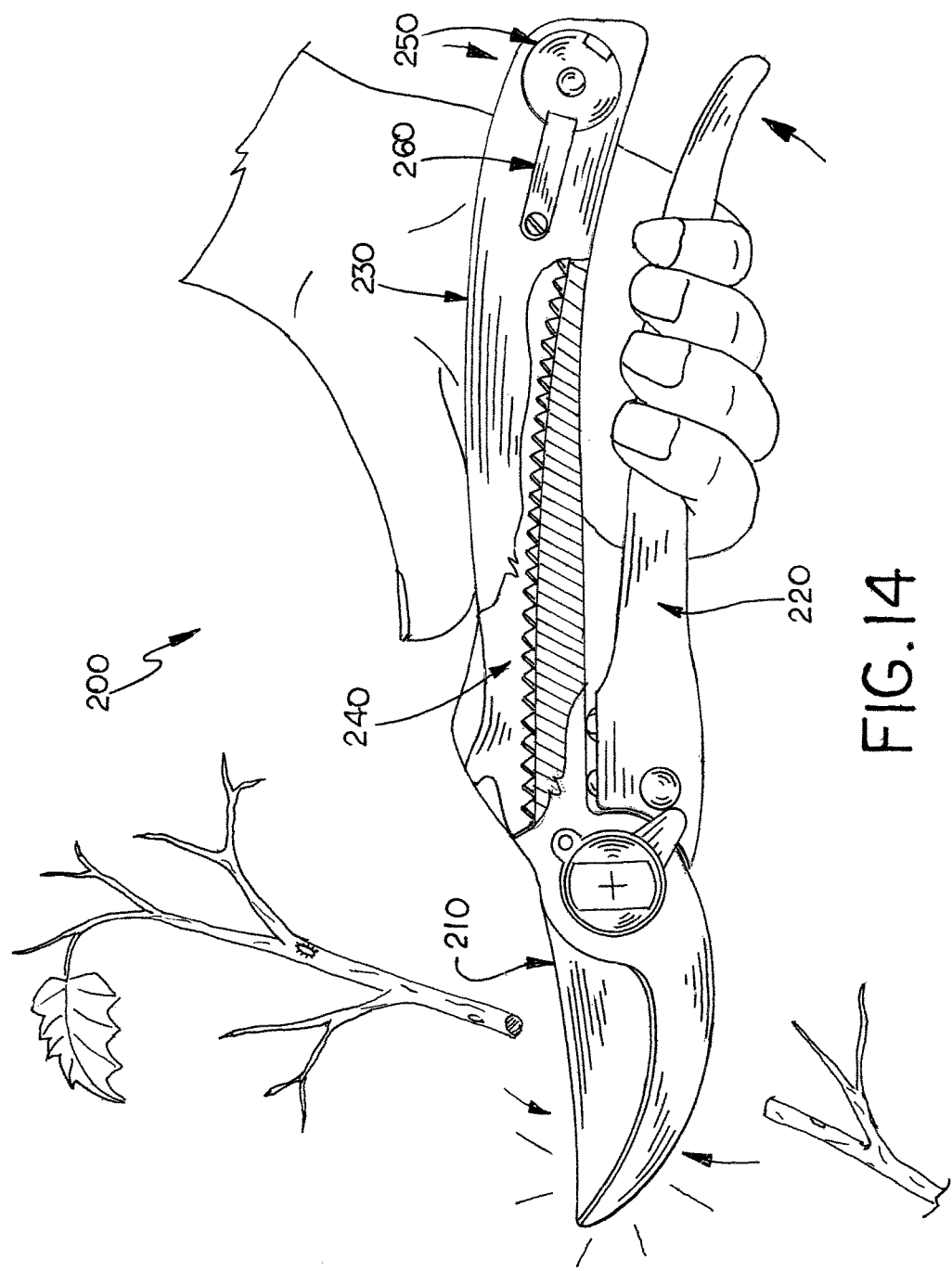
FIG. 14 is a left side view of the pruning tool of FIG. 12 held by a user in the "shear grip"
Figure 15:
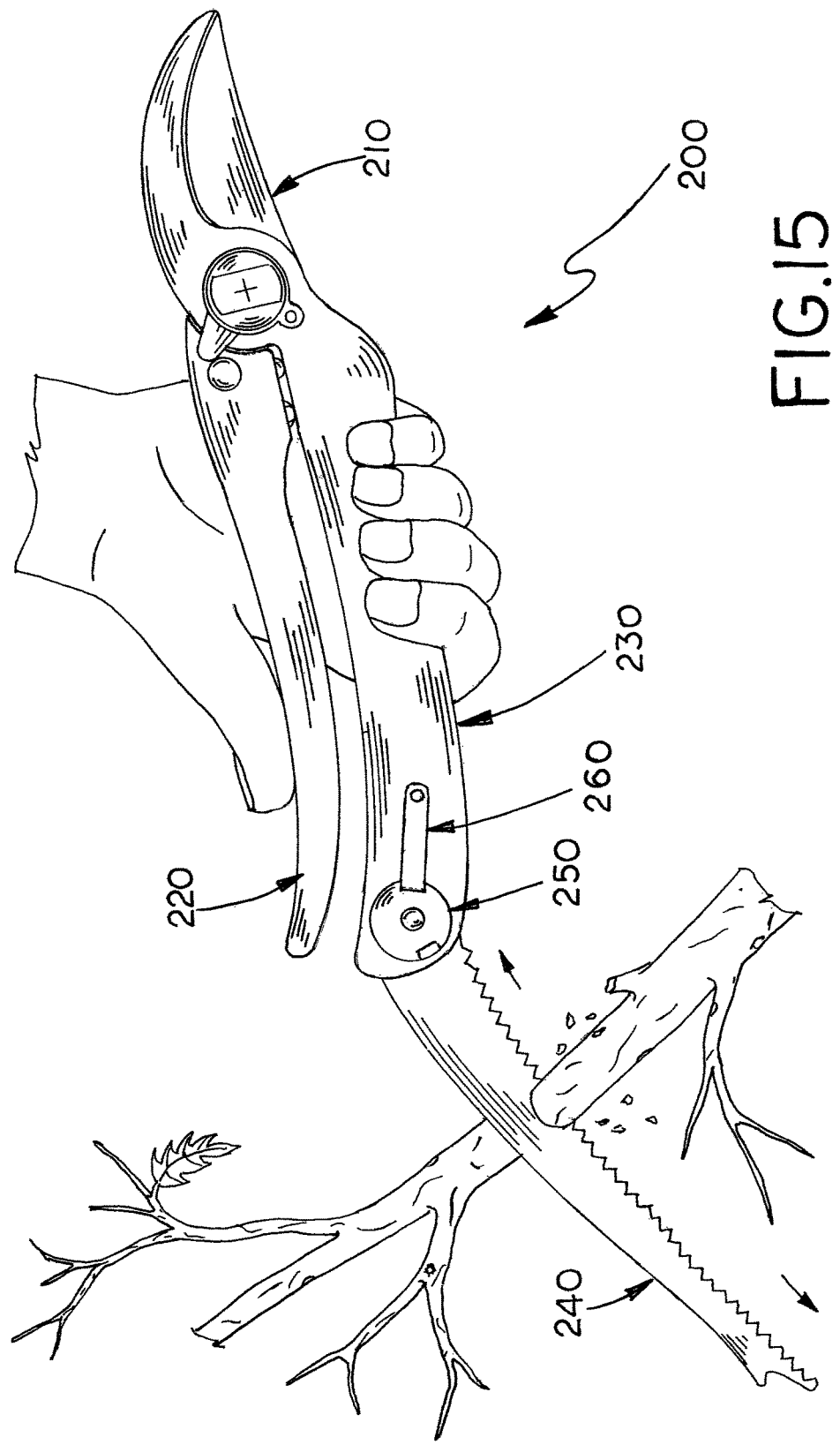
FIG. 15 is a left side view of the pruning tool of FIG. 12 with the saw blade deployed and held by a user in the "saw grip."

FIGS. 12-15 illustrate a second embodiment of the pruning tool of this invention designated generally as reference numeral 200. Tool 200 is substantially identical in construction and operation to tool 100, above. Pruning tool 200 differs from pruning tool 100 in that folding saw blade 240 deploys from the distal end of the handle rather than the proximal end of handle 230 as with pruning tool 100. As with pruning tool 100, saw blade 240 is pivotally connected to handle 230 for movement between a stowed position disposed within a longitudinal slot 231 formed in the handle (FIG. 12) and an extended operational position (FIG. 13). Again Saw blade 240 is pivotally connected to handle 230 by a pivot barrel 250 rotatably disposed within a cylindrical opening 133 formed in the aft end of the handle. Pruning tool 200 as employs a saw blade locking mechanism 260, which is identical in design and function to that of pruning tool 100. As before, to use pruning tool 200 as a shear, the user grips pruning tool 200 using the "shear grip" (FIG. 14). To use pruning tool 200 as a pruning saw, the user rotates pruning tool 200 about longitudinal axis 180 degrees and also rotates the tool 180 degrees about a lateral axis to assume a reversed "saw grip" (FIG. 15).

Advantages

One skilled in the art will note several advantages of the pruning tool of this invention. The pruning tool allows a user to quickly transition from clipping limbs using the tool as a pruning shear to cutting limbs using the tool as a pruning saw. The ability to deploy and retract a saw blade from a pruning shear effectively eliminates the need for workers to wear more than one tool scabbard. It also eliminates the possibility of saws and hand pruners being carelessly placed into pockets or atop ladders when not in immediate use. Improperly secured tools, particularly those left atop ladders, pose a very real risk to the safety of workers in the field and those passing below. Integrating a pruning saw into a pruning shear allows the user to always have one free hand with which to hold onto a ladder or tree and, when necessary, to have a free hand available with which to hold onto the branch being cut. Having one hand free at all times, combined with a great reduction in the need to shift from one tool to another, will greatly increase the physical safety and effectiveness of workers at height.

It should be apparent from the foregoing that an invention having significant advantages has been provided. While the invention is shown in only a few of its forms, it is not just limited but is susceptible to various changes and modifications without departing from the spirit thereof. The embodiment of the present invention herein described and illustrated is not intended to be exhaustive or to limit the invention to the precise form disclosed. It is presented to explain the invention so that others skilled in the art might utilize its teachings. The embodiment of the present invention may be modified within the scope of the following claims.

I claim:

1. A handheld pruning tool for pruning plants comprising:
a pair of pivotally connected elongated shear members, each of the pair of shear members has an elongated handle and a blade part extending from adjacent ends of the handle thereof, the pair of shear members are pivotally connected by a pivot part positioned between the adjacent blade part and handle part thereof such that the blade parts form a shear head and the handles form a combined grip for the tool, the handle of the one of the pair of shear members has a longitudinal slot formed therein;
an elongated saw blade rotatably connected to the one of the pair of shear members for movement between a stowed position where the saw blade is disposed axially within the slot of the handle of the one of the pair of shear members and an operational position where the saw blade extends outward from the handle of the one of the pair of shear members; and
a lock mechanism mounted to the handle of the one of the pair of shear members for securing the saw blade in one of the stowed position and the operational position, the lock mechanism includes a rotating barrel disposed within the handle of one of the pair of shear members and a lock bar mounted to the side of the handle of the one of the pair of shear members, the saw blade is detachably mounted to the barrel, the lock bar is an elongated member having a contact surface extending along its longest length, the elongated member also having an end thereof affixed to the handle of the one of the pair of shear members and an opposite end thereof adapted to restrictively engage the barrel, the contact surface of the lock bar is exposed on the outside of the handle of the one of the pair of shear members, the barrel has a pair of notches spaced radially around the periphery thereof, the opposite end of the lock bar seats within one of the pair of notches when the saw blade is in the stowed position and seats within the other of the pair of notches when the saw blade is in the operational position, the barrel also includes an annular groove formed around the exterior circumference of the barrel and adapted to receive the opposite end of the lock bar, the opposite end of the lock bar sits within and slides along the annular groove when the saw blade is moved between the stowed position and the operational position.

2. The pruning tool of claim 1 wherein the saw blade is pivotally connected to the handle of the one of the pair of shear members adjacent the pivot point such that the saw blade extends over the shear head when in the operational position.

3. The pruning tool of claim 1 wherein the saw blade is pivotally connected to the handle of the one of the pair of shear members at an end of the handle opposite the pivot point such that the saw blade extends longitudinally from the handle when in the operational position.

4. The pruning tool of claim 1 wherein the handles of each of the pair of shear members are configured to be gripped in a first orientation for using the pruning tool as a pruning shear and gripped in a second orientation for using the pruning tool as a saw when the saw blade is in the operational position.

5. The pruning tool of claim 4 wherein the second orientation of the handles is rotated 180 degrees about a longitudinal axis of the pruning tool from the first orientation of the handles.

6. The pruning tool of claim 3 wherein the second orientation of the handles is rotated 180 degrees about a longitudinal axis through the pruning tool from the first orientation of the handles and 180 degrees about a lateral axis through the pruning tool from the first orientation of the handles.

7. A handheld pruning tool for pruning plants comprising:
a pair of pivotally connected elongated shear members; and
an elongated saw blade rotatably connected to one of the pair of shear members for movement between a stowed position where the saw blade aligns axially with the one of the pair of shear members and an operational position where the saw blade extends outward from the one of the pair of shear members; and
a lock mechanism mounted to the handle of the one of the pair of shear members for securing the saw blade in one of the stowed position and the operational position,
each of the pair of shear members has an elongated handle and a blade part extending from adjacent ends of the handles thereof, the pair of shear members are pivotally connected by a pivot part positioned between the adjacent blade part and handle part thereof such that the blade parts form a shear head and the handles form a combined grip for the tool,
the handle of the one of the pair of shear members has a longitudinal slot formed therein for receiving the saw blade therein when the saw blade is in the stowed position,
the lock mechanism includes a rotating barrel disposed within the handle of one of the pair of shear members and a lock bar mounted to the side of the handle of the one of the pair of shear members, the lock bar is an elongated member having a contact surface extending along its longest length, the elongated member also having an end thereof affixed to the handle of the one of the pair of shear members and an opposite end thereof adapted to restrictively engage the barrel, the contact surface of the lock bar is exposed on the outside of the handle of the one of the pair of shear members,
the saw blade is rotatably connected to the handle of the one of the pair of shear members at an end of the handle opposite the pivot point such that the saw blade extends longitudinally from the handle when in the operational position by a rotating barrel disposed within a lateral bore formed in the handle of one of the pair of shear members, the saw blade is detachably mounted to the barrel,
the barrel has a pair of notches spaced radially around the periphery thereof, the opposite end of the lock bar seats within one of the pair of notches when the saw blade is in the stowed position and seats within the other of the pair of notches when the saw blade is in the operational position, the barrel also includes an annular groove formed around the exterior circumference of the barrel and adapted to receive the opposite end of the lock bar, the opposite end of the lock bar sits within and slides along the annular grove when the saw blade is moved between the stowed position and the operational position.

* * * * *